United States Patent
Eun et al.

(10) Patent No.: US 8,405,814 B2
(45) Date of Patent: Mar. 26, 2013

(54) LIQUID CRYSTAL DISPLAY DEVICE AND FABRICATING METHOD THEREOF

(75) Inventors: Chong Chan Eun, Paju-si (KR); Tae Man Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 709 days.

(21) Appl. No.: 11/477,799

(22) Filed: Jun. 30, 2006

(65) Prior Publication Data

US 2007/0071909 A1 Mar. 29, 2007

(30) Foreign Application Priority Data

Sep. 28, 2005 (KR) .................. 10-2005-0090635

(51) Int. Cl.
*G02F 1/1341* (2006.01)
*G02F 1/1339* (2006.01)
*G02F 1/13* (2006.01)

(52) U.S. Cl. .................. 349/189; 349/190; 349/192

(58) Field of Classification Search .................. 349/187, 349/189, 190, 84, 192, 153
See application file for complete search history.

(56) References Cited

U.S. PATENT DOCUMENTS

| | | | | |
|---|---|---|---|---|
| 3,808,769 A | * | 5/1974 | Gardiner et al. | 53/489 |
| 4,135,789 A | * | 1/1979 | Hall | 349/154 |
| 5,583,671 A | * | 12/1996 | Yoshida et al. | 349/93 |
| 5,592,318 A | * | 1/1997 | Majima et al. | 349/122 |
| 5,835,176 A | * | 11/1998 | Jeong et al. | 349/124 |
| 5,892,561 A | * | 4/1999 | Suzuki et al. | 349/122 |
| 6,693,699 B2 | * | 2/2004 | Inoue et al. | 349/158 |
| 6,784,969 B1 | * | 8/2004 | Lim | 349/189 |
| 6,930,748 B2 | * | 8/2005 | Moon | 349/158 |
| 7,130,006 B2 | * | 10/2006 | Chu et al. | 349/110 |
| 7,180,566 B2 | * | 2/2007 | Lee | 349/154 |
| 7,256,862 B2 | * | 8/2007 | Chen et al. | 349/192 |
| 7,319,504 B2 | * | 1/2008 | Liu et al. | 349/187 |
| 2001/0026348 A1 | * | 10/2001 | Murata et al. | 349/187 |
| 2003/0043338 A1 | * | 3/2003 | Liou et al. | 349/189 |
| 2003/0103185 A1 | * | 6/2003 | Kim et al. | 349/156 |
| 2004/0207800 A1 | * | 10/2004 | Hiruma et al. | 349/189 |
| 2005/0057716 A1 | * | 3/2005 | Hou et al. | 349/154 |

FOREIGN PATENT DOCUMENTS

| | | |
|---|---|---|
| JP | 5-5892 | 1/1993 |
| JP | 5-5893 | * 5/1993 |
| KR | 10-2003-0076873 | 9/2003 |
| KR | 10-2005-0073659 | 7/2005 |

* cited by examiner

*Primary Examiner* — Mark Robinson
*Assistant Examiner* — Robert Tavlykaev
(74) *Attorney, Agent, or Firm* — McKenna Long & Aldridge, LLP

(57) ABSTRACT

A liquid crystal display device and fabricating method thereof are disclosed, by which insufficient or excessive filling of liquid crystals can be cured by adjusting a liquid crystal quantity in a liquid crystal display device having the insufficient or excessive filling of liquid crystals generated thereon. The present invention includes the steps of preparing a liquid crystal cell including a first substrate, a second substrate and a liquid crystal layer between the first and second substrates, checking a liquid crystal quantity within the liquid crystal cell, forming a hole in the liquid crystal cell, adjusting the liquid crystal quantity through the hole, and blocking the hole.

6 Claims, 4 Drawing Sheets

LIQUID CRYSTAL DISPLAY DEVICE AND FABRICATING METHOD THEREOF

This application claims the benefit of the Korean Patent Application No. P2005-90635, filed on Sep. 28, 2005, which is hereby incorporated by reference for all purposes as if fully set forth herein. This application incorporates by reference co-pending application, Ser. No. 10/184,096, filed on Jun. 28, 2002 entitled "SYSTEM AND METHOD FOR MANUFACTURING LIQUID CRYSTAL DISPLAY DEVICES FROM LARGE MOTHER SUBSTRATE PANELS"; and co-pending application, Ser. No. 11/476,919, filed on Jun. 29, 2006, entitled "METHODS OF MANUFACTURING LIQUID CRYSTAL DISPLAY DEVICES" for all purposes as if fully set forth herein.

BACKGROUND OF THE INVENTION

1. Field of the Invention

The present invention relates to a liquid crystal display device, and more particularly, to a liquid crystal display device and fabricating method thereof. Although the present invention is suitable for a wide scope of applications, it is particularly suitable for adjusting a quantity of liquid crystals in the liquid crystal display device fabricated by liquid crystal dropping method.

2. Discussion of the Related Art

Generally, liquid crystal display (LCD) devices are used as flat panel display devices because of their thin screens and low operational voltage which give LCD panels to consume less power and an excellent portability, making them suitable for a variety of applications including notebook computers, monitors, aerospace applications and the like.

This liquid crystal display device is in detail explained with reference to the attached drawing as follows.

FIG. 1 is an exploded perspective diagram of a liquid crystal display device according to a related art.

Referring to FIG. 1, a liquid crystal display device according to a related art consists of a lower substrate 10, an upper substrate 20 facing the lower substrate 10 leaving a prescribed distance therebetween, and a liquid crystal layer (not shown in the drawing) provided between the lower and upper substrates.

A gate line 12 and a data line 14 are formed on the lower substrate 10 to define a pixel area by crossing with each other. A thin film transistor T used as a switching device is formed at the crossing of the gate and data lines 12 and 14. A pixel electrode 16 connected to the thin film transistor T is formed in the pixel area.

A shield layer 22 is formed on the upper substrate 20 to cut off light from leaking from outside the pixel area. A color filter layer 24 of red (R), green (G) and blue (B) is formed on a part corresponding to the pixel area to represent colors. Furthermore, a common electrode 26 is formed on the color filter layer 24.

The above-configured liquid crystal display device is fabricated by preparing the lower and upper substrates and forming a liquid crystal layer between the prepared substrates. In this case, the liquid crystal layer is formed between both of the substrate by a vacuum injection method or a liquid crystal dropping method.

The vacuum injection method is carried out by forming a sealant having one inlet on one of the two prepared substrates, bonding the two substrates together and injecting liquid crystals into a space between the two substrates via the inlet.

The liquid crystal dropping method is carried out by forming a sealant having no inlet on one of the two prepared substrates, dropping liquid crystals on the substrate and bonding the two substrates together.

As a size of a substrate increases, it takes so much time in injecting liquid crystals by the vacuum injection method as to reduce manufacturing productivity. So, the liquid crystal dropping method is more suitable for large-scale substrates. However, in the liquid crystal dropping method it is difficult to calculating the proper quantity of liquid crystals.

In particular, the liquid crystal dropping method differs from the vacuum injection method in dropping a prescribed quantity of liquid crystals after calculating a liquid crystal quantity by considering a cell size, a cell height and the like. It is substantially difficult to calculate a precise quantity of liquid crystals due to various factors.

If the liquid crystal quantity calculated is too small, a filling-failure area of liquid crystals is generated within a liquid crystal display panel. If the liquid crystal quantity calculated too large, an over-filling area is generated within a liquid crystal display panel, lowering the quality of the display.

Many efforts have been made to minimize the generation of the insufficient or excessive filling of liquid crystals in various ways. Once the insufficient or excessive filling of liquid crystals takes place, there is no way in the related art to correct the insufficient or excessive filling of liquid crystals. If the filling error is serious, the corresponding panel must be discarded, which is not economical.

SUMMARY OF THE INVENTION

Accordingly, the present invention is directed to a liquid crystal display device and fabricating method thereof that substantially obviate one or more problems due to limitations and disadvantages of the related art.

An object of the present invention is to provide a method of fabricating a liquid crystal display device, by which insufficient or excessive filling of liquid crystals can be cured by adjusting a liquid crystal quantity in a liquid crystal display device having the insufficient or excessive filling of liquid crystals generated thereon.

Another object of the present invention is to provide a liquid crystal display device, in which insufficient or excessive filling of liquid crystals can be cured by adjusting a liquid crystal quantity in the liquid crystal display device having the insufficient or excessive filling of liquid crystals generated thereon.

Additional advantages, objects, and features of the invention will be set forth in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of fabricating a liquid crystal display device according to the present invention includes the steps of preparing a liquid crystal cell including a first substrate, a second substrate and a liquid crystal layer between the first and second substrates, checking a liquid crystal quantity within the liquid crystal cell, forming a hole in the liquid crystal cell, adjusting the liquid crystal quantity through the hole, and blocking the hole.

For example, a shield layer is formed on the first substrate to prevent light leakage in the liquid crystal cell preparing step and wherein the hole is formed in an area where the shield layer of the first substrate is formed. More For example, the hole is formed in an area where a most outer shield layer of the first substrate is formed.

For example, a gate pad part and a data pad part are formed on the second substrate in the liquid crystal cell preparing step and the hole is formed at least one side of the liquid crystal cell where the gate and data pad parts are not formed.

For example, a plurality of holes are formed in the hole forming step.

For example, the hole is formed in the liquid crystal cell using a drill equipment, an ultrasonic equipment or a laser equipment.

For example, a prescribed quantity of excessive filling liquid crystals is externally discharged in the liquid crystal quantity adjusting step. More For example, the prescribed quantity of the excessive filling liquid crystals is externally discharged by pressurizing the liquid crystal cell.

For example, a prescribed quantity of insufficient filling liquid crystals is injected in the liquid crystal cell in the liquid crystal quantity adjusting step.

For example, the hole blocking step includes the steps of injecting a filler in the hole and hardening the filler. More For example, the filler is formed of an opaque material.

For example, the liquid crystal quantity is checked by an unaided-eye examination.

For example, the liquid crystal cell preparing step includes the steps of preparing the first and second substrates, forming a sealant on one of the first and second substrates, dropping a prescribed quantity of liquid crystals on one of the first and second substrates, and bonding the first and second substrates together.

In another aspect of the present invention, a liquid crystal display device includes a first substrate, a second substrate, a liquid crystal layer between the first and second substrates, a liquid crystal quantity adjusting hole provided to at least one of the first and second substrates, and a filer blocking the hole.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or like parts.

FIGS. 2A to 2D are diagrams explaining a method of fabricating a liquid crystal display device according to one embodiment of the present invention. In each of the drawings, a left diagram indicates a layout of a liquid crystal display device and a right diagram indicates a cross-sectional diagram of the liquid crystal display device along a cutting line I-I of the left diagram.

Figure 1:
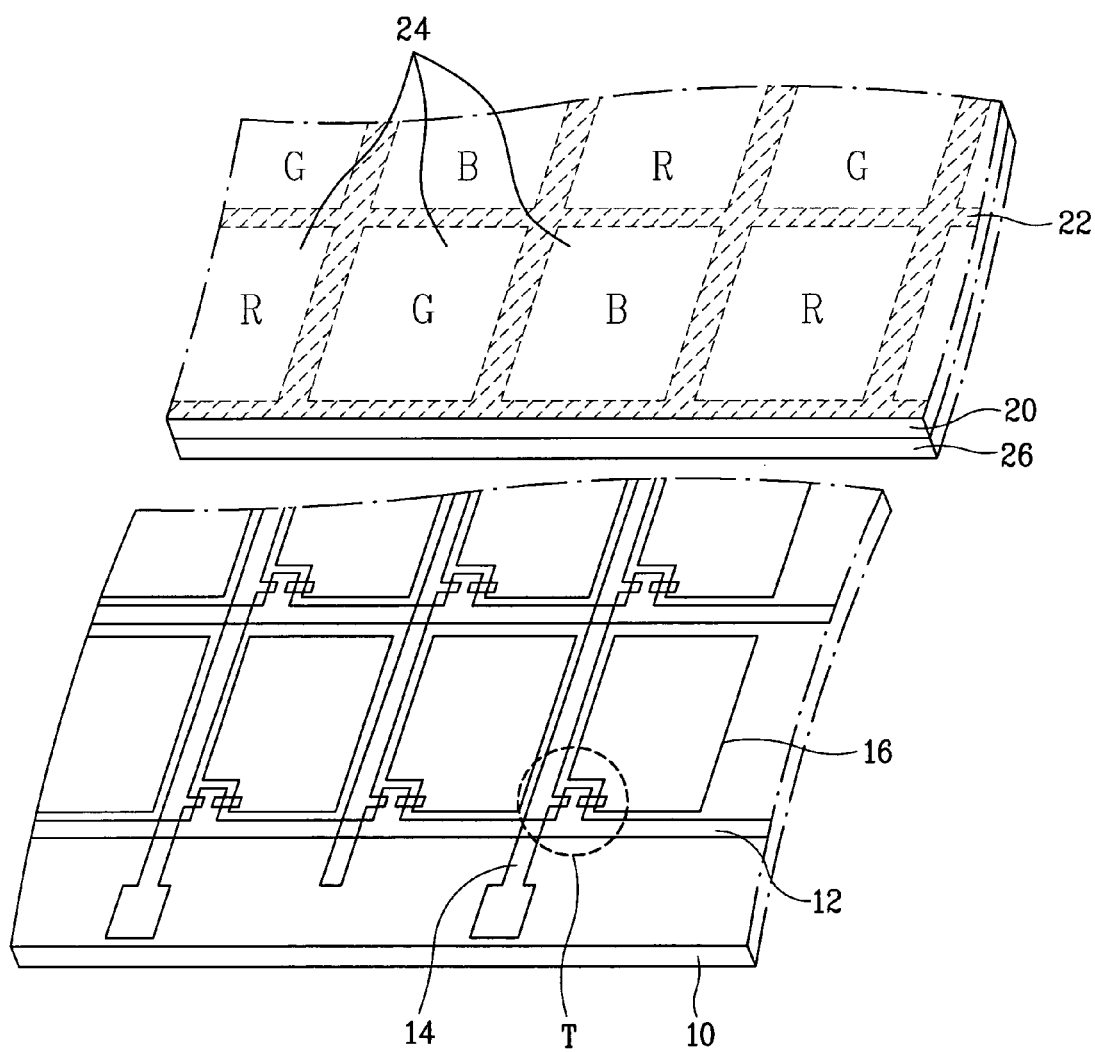
FIG. 1 is an exploded perspective diagram of a liquid crystal display device according a related art.
Figure 2A:
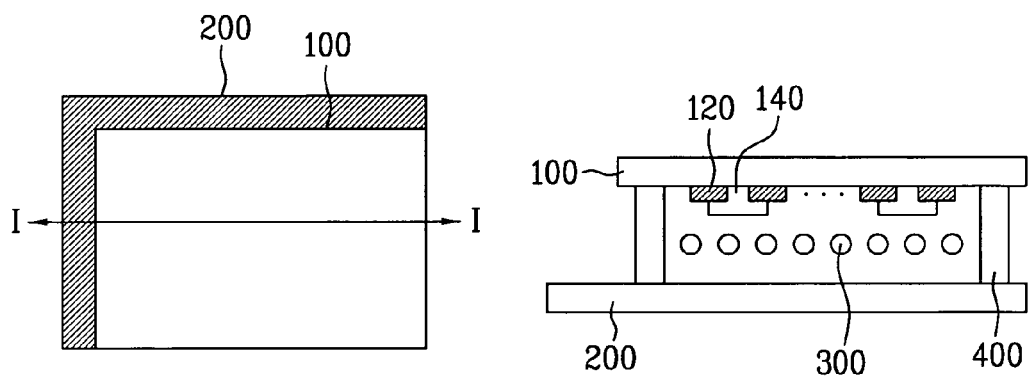
FIGS. 2A to 2D are diagrams for explaining a method of fabricating a liquid crystal display device according to one embodiment of the present invention.

Referring to FIG. 2A, a liquid crystal cell is prepared that includes a first substrate 100, a second substrate 200, and a liquid crystal layer 300 formed between both of the substrates 100 and 200.

The liquid crystal cell is prepared by a process of preparing the first substrate 100, a process of preparing the second substrate 200, and a process of forming the liquid crystal layer 300 between the substrates 100 and 200 and bonding the substrates 100 and 200 together.

The process of preparing the first substrate 100 includes forming a shield layer 120 to prevent light leakage on the transparent first substrate 100 and forming a color filter layer 140 on an area between the shield layer 120.

In addition, a common electrode (not shown in the drawing) can be formed on the color filter layer 140. In an IPS (in-plane switching) mode liquid crystal display device, the common electrode is formed not on the first substrate but on the second substrate 200 in parallel with a pixel electrode.

The process of preparing the second substrate 200 includes the steps of forming a gate line and a data line crossing with each other to define a pixel area, forming a thin film transistor switching device at a crossing of the gate line and the data line, and forming a pixel electrode in the pixel area to be electrically connected to the thin film transistor.

In this example, a gate pad part is formed at one end portion of the gate line and a data pad part is formed on one end portion of the data line. Thus, the gate or data line is connected to a drive circuit via the corresponding pad part.

Because the gate and data pad parts are provided to the second substrate 200, each side of the second substrate 200 is greater than that of the first substrate 100. And, the gate or data pad part is formed on the corresponding side (a shaded portion in the left diagram of FIG. 2A) of the second substrate 200.

The process of forming the liquid crystal layer 300 between the substrates 100 and 200 and bonding the substrates 100 and 200 together is performed by a liquid crystal dropping method. In particular, a sealant 400 is formed one of the substrates 100 and 200, a prescribed quantity of liquid crystals 300 is dropped on one of the substrates 100 and 200, and the substrates 100 and 200 are then bonded together.

In the above-explained process of preparing the liquid crystal cell, materials and forming methods of the respective elements can be modified according to various methods known to those skilled in the art.

Subsequently, by checking a quantity of the liquid crystals 300, it can be determined whether the filling process has provided an insufficient or excessive amount of the liquid crystals.

Checking the quantity of liquid crystals in a liquid crystal cell can be performed according to a general unaided-eye examination or other check methods known to those skilled in the art.

If it is decided that a proper quantity of the liquid crystals is not dropped according to the liquid crystal quantity check (i.e., in the event of an insufficiently filled area due to lack of a liquid crystal quantity or in the even of an excessively filled area due to an excessive quantity of liquid crystals), a liquid crystal quantity adjusting process discussed below is carried out.

Figure 2B:
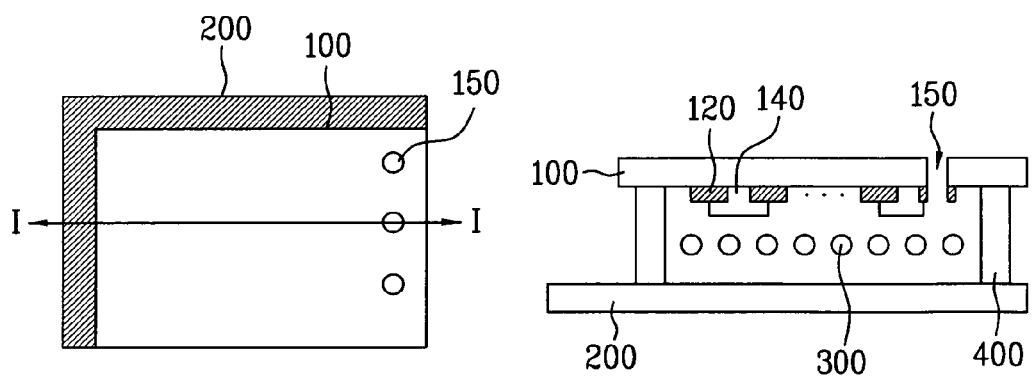

If the insufficient or excessive filling area has resulted, a hole 150, as illustrated in FIG. 2B, is formed in the liquid crystal cell.

The hole 150 is, for example, formed in an area where the shield layer 120 of the first substrate 100 is formed. For example, the hole 150 is formed on an area where a most outer part of the shield layer 120 of the first substrate 100 is formed.

The hole 150 may be formed in at least one side of the liquid crystal cell where the gate and pad parts (shaded portion) are not formed to minimize any effect or influence put on the pad parts in adjusting the liquid crystal quantity in a later process.

Moreover, a plurality of holes 150 can be formed according to the extent of the insufficient or excessive filling instead of restricting the number of the holes 150.

The hole 150 can be formed in the liquid crystal cell using equipment such as a drill, an ultrasonic device, a laser device or the like. In addition, the hole 150 can be formed in various ways known to those skilled in the art.

Figure 2C:
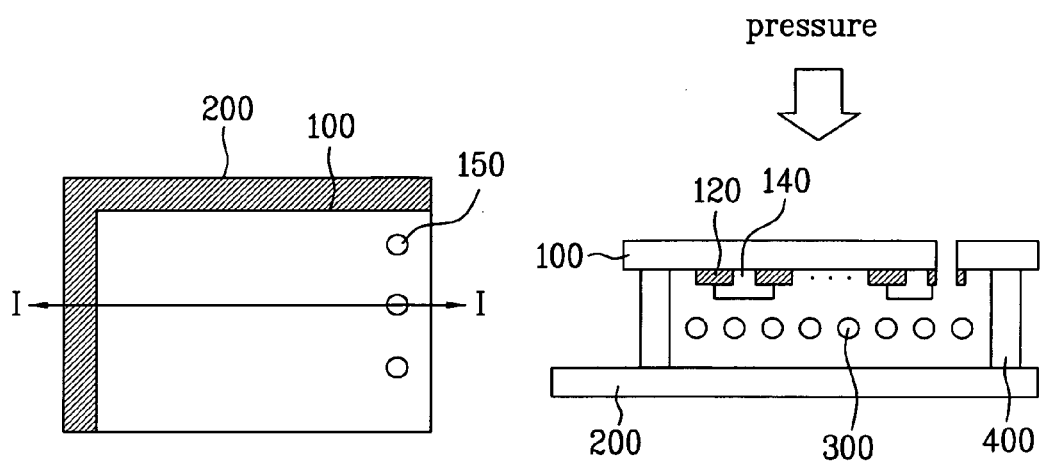

By pressurizing the liquid crystal cell, as shown in FIG. 2C, a prescribed quantity of the excess liquid crystals is externally discharged.

FIG. 2C illustrates an example of excessive filling of liquid crystals. In the event of insufficient filing of the liquid crystals, a prescribed quantity of liquid crystals is injected into the liquid crystal cell via the hole 150.

Since the quantity of the externally discharged liquid crystals varies according to a size of the pressure applied to the liquid crystal cell, a proper pressure is selected according to the quantity of the excessive filling liquid crystals in the liquid crystal cell.

Figure 2D:
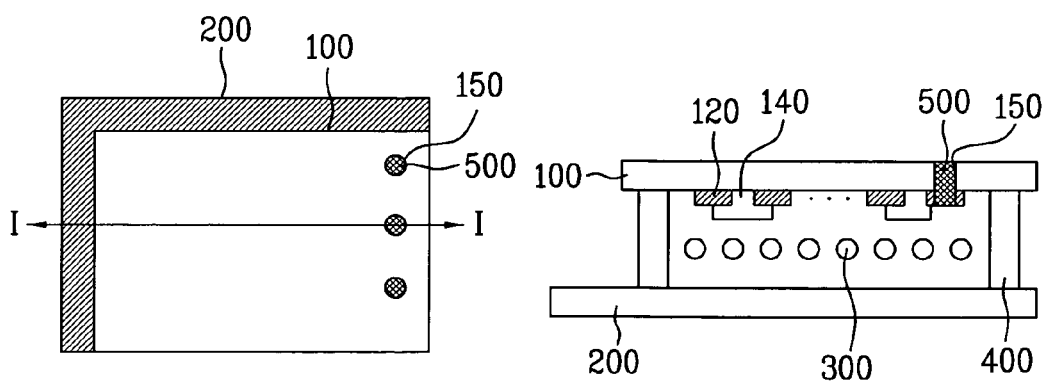

Subsequently, the hole 150, as shown in FIG. 2D, is blocked or otherwise closed.

The process of blocking the hole 150 includes the steps of injecting a filler 500 in the hole 150 and hardening the filler 500.

In this case, the filler 500 is hardened in a manner of applying heat or UV-rays according to a property of the filler 500.

If the hole 150 is formed on the area where the shield layer 140 is formed, the filer 500 is formed of an opaque material to enable a light-shielding function.

Figure 3:
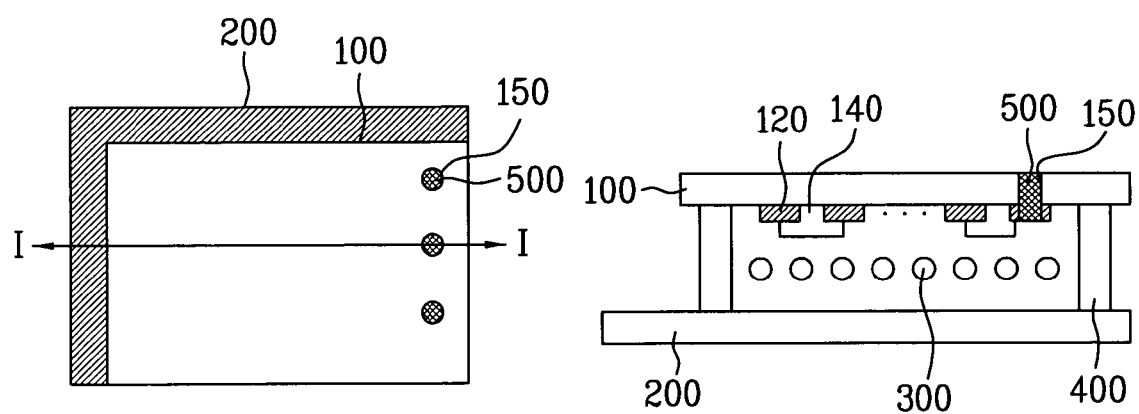
FIG. 3 is a diagram of a liquid crystal display device according to one embodiment of the present invention, in which a liquid crystal quantity is adjusted.

FIG. 3 is a diagram of a liquid crystal display device according to one embodiment of the present invention, in which a left diagram indicates a layout of a liquid crystal display device and a right diagram indicates a cross-sectional diagram of the liquid crystal display device along a cutting line I-I of the left diagram.

Referring to FIG. 3, a liquid crystal display device according to one embodiment of the present invention includes a first substrate 100, a second substrate 200, a liquid crystal layer 300 formed between the substrates 100 and 200, a liquid crystal quantity adjusting hole 150 formed in the first substrate 100 and a filler 500 blocking the hole 150.

A shield layer 120 is formed on the first substrate 100 to prevent light leakage and a color filter layer 140 is formed on an are between the shield layer 120.

And, a common electrode (not shown in the drawing) can be formed on the color filter layer 140.

A gate line (not shown in the drawing) and a data line (not shown in the drawing) are formed crossing each other on the second substrate 200 to define a pixel area. A gate pad part is formed at one end portion of the gate line and a data pad part is formed at one end portion of the data line. The gate and data pad parts are formed in a shaded portion shown in FIG. 3.

A thin film transistor is formed as a switching device at an intersection between the gate and data lines and a pixel electrode is formed in the pixel area to be electrically connected to the thin film transistor.

The hole 150 is formed in an area where a shield layer 120 of the first substrate 100 is formed. For example, the hole 150 may be formed in an area where a most outer shield layer 120 is formed.

For example, the hole 150 is formed in at least one side of a liquid crystal cell where the gate and data pad parts are not formed.

Optionally, a plurality of holes 150 can be formed according to an extent of failure.

The filler 500 blocking the hole 150 is formed of an opaque material for a light-shielding function.

Accordingly, the present invention provides the following effect or advantage.

Although an insufficient or excessive filling area is generated due to an inaccurate quantity of dropped liquid crystals, the liquid crystal quantity can be adjusted through a hole formed in a liquid crystal cell. Hence, a liquid crystal quantity failure can be cured.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of fabricating a liquid crystal display device, comprising:

preparing a first substrate and a second substrate and forming a shield layer on the first substrate to prevent light leakage;

forming a sealant on one of the first and second substrates;

dropping liquid crystals on one of the first and second substrates so as to form a liquid crystal layer;

bonding the first and second substrates together so as to make a liquid crystal cell;

checking a quantity of liquid crystals within the liquid crystal cell;

forming a first hole in the first substrate and subsequently forming a second hole in the shield layer at the same position as the first hole, wherein the first and second holes are formed on an area where a most outer part of the shield layer of the first substrate is formed;

adjusting the quantity of liquid crystals through the first hole and the second hole, wherein the adjusting the quantity of liquid crystals comprises injecting a prescribed quantity of liquid crystals in the liquid crystal cell;

blocking the first hole and the second hole with a filler made of an opaque material, wherein a width of the filler is shorter than a width of the shield layer; and wherein the shield layer in which the second hole is formed does not overlap with an area of the sealant, wherein the step of blocking includes injecting the filler in the first and second holes and fully filling the filler in the first hole and the second hole so that a top surface of the filler and a top surface of the first substrate are coplanar to each other.

2. The method of claim 1, wherein a gate pad part and a data pad part are formed on the second substrate in the first and second substrates preparing step and wherein the hole is formed at least one side of the liquid crystal cell where the gate and data pad parts are not formed.

3. The method of claim 1, wherein a plurality of the first holes and the second holes are formed in the hole forming step.

4. The method of claim 1, wherein the first hole and the second hole are formed in the liquid crystal cell using a drill equipment, an ultrasonic equipment or a laser equipment.

5. The method of claim 1, the first hole and the second hole blocking comprising: injecting a filler in the first hole and the second hole as the opaque material; and hardening the filler.

6. The method of claim 1, wherein the step of checking a liquid crystal quantity is performed by an unaided-eye examination.

* * * * *